US009869533B2

(12) United States Patent
Vanarsdalen et al.

(10) Patent No.: US 9,869,533 B2
(45) Date of Patent: Jan. 16, 2018

(54) BLAST AND BALLISTIC IMPROVEMENT IN HELMETS

(71) Applicants: E I DU PONT DE NEMOURS AND COMPANY, Wilmington, DE (US); GOVERNMENT OF THE UNITED STATES AS REPRESENTED BY THE SECRETARY OF THE NAVY, Washington, DC (US)

(72) Inventors: Bryce Vanarsdalen, Cherry Hill, NJ (US); Philip Dudt, North Bethesda, MD (US); Roshdy G Barsoum, McLean, VA (US); Alyssa Littlestone, Arlington, VA (US); Charles M Roland, Waldorf, MD (US)

(73) Assignees: E I DU PONT DE NEMOURS AND COMPANY, Wilmington, DE (US); THE UNITED SATES OF AMERICA AS REPRESENTED BY THE SECRETARY OF THE NAVY, Washington, DC (US)

( * ) Notice: Subject to any disclaimer, the term of this patent is extended or adjusted under 35 U.S.C. 154(b) by 199 days.

(21) Appl. No.: 14/676,974

(22) Filed: Apr. 2, 2015

(65) Prior Publication Data
US 2016/0076854 A1    Mar. 17, 2016

Related U.S. Application Data

(60) Provisional application No. 61/975,102, filed on Apr. 4, 2014.

(51) Int. Cl.
B32B 3/30        (2006.01)
F41H 1/08        (2006.01)
(Continued)

(52) U.S. Cl.
CPC ............... F41H 1/08 (2013.01); B32B 5/022 (2013.01); B32B 5/024 (2013.01); B32B 27/12 (2013.01);
(Continued)

(58) Field of Classification Search
CPC ..... F41H 1/08; F41H 1/02; F41H 1/04; F41H 5/06; F41H 5/08; F41H 5/02; F41H 5/04;
(Continued)

(56) References Cited

U.S. PATENT DOCUMENTS 7,300,893 B2    11/2007   Barsoum et al.
7,938,053 B1    5/2011    Dudt et al.
(Continued)

OTHER PUBLICATIONS

ASTM Designation:E3005-1 Standard Terminology for Body Armor (2016).
(Continued)

*Primary Examiner* — Aaron Austin
*Assistant Examiner* — Megha M Gaitonde

(57) ABSTRACT

A composite article having blast and ballistic resistance suitable for helmets, personal protection and hard armor applications comprises a high-strain hardening elastomeric layer and a layer of continuous yarns having a tenacity of 15 grams per dtex and a modulus of at least 500 grams per dtex or an oriented polyethylene sheet layer having a modulus ten times greater in one direction than in another direction.

12 Claims, 2 Drawing Sheets

(51) Int. Cl.
*B32B 27/12* (2006.01)
*B32B 5/02* (2006.01)
*B32B 27/40* (2006.01)
*F41H 5/04* (2006.01)

(52) U.S. Cl.
CPC ........... *B32B 27/40* (2013.01); *F41H 5/0485* (2013.01); *B32B 2262/0253* (2013.01); *B32B 2262/0269* (2013.01); *B32B 2571/02* (2013.01)

(58) Field of Classification Search
CPC .... F41H 5/0442; F41H 5/0471; F41H 5/0492; F41H 5/0457; F41H 5/0478; B32B 5/02; B32B 5/024; B32B 27/02; B32B 27/06; B32B 27/08; B32B 27/32; B32B 27/34; B32B 27/40; B32B 2571/02; B32B 3/10; B32B 3/26; B32B 3/30; Y10T 428/24479; Y10T 428/24504; Y10T 428/24512; Y10T 428/24537; Y10T 428/24612; Y10T 428/24942; Y10T 428/2495

USPC ....... 428/156, 159, 160, 163, 164, 166, 167, 428/168, 171, 172, 212, 213
See application file for complete search history.

(56) References Cited

U.S. PATENT DOCUMENTS

| | | |
|---|---|---|
| 8,105,510 B1 | 1/2012 | Martin et al. |
| 2009/0114083 A1* | 5/2009 | Moore, III ............ F41H 5/0421 89/36.02 |
| 2011/0117351 A1 | 5/2011 | Sauer et al. |
| 2013/0071642 A1* | 3/2013 | Carbajal .................. B32B 5/06 428/219 |

OTHER PUBLICATIONS

Pursuit Magazine, An Introduction to Body Armor and Bullet-Proof Vests; Everything You've Ever Wanted to Know About Body Armor and Protective Clothing (2014).
Body Armor 101—RE Factor Tactical Blog (2014).
Body Armor—National Institute of Justice (2014).

* cited by examiner

US 9,869,533 B2

BLAST AND BALLISTIC IMPROVEMENT IN HELMETS

STATEMENT OF GOVERNMENT INTEREST

This invention was made with government support under contract NCRADA-NSWCCA-II-100 awarded by the Naval Surface Warfare Center, Carderock Division (NSWCCD). The government has certain rights in the invention.

BACKGROUND OF THE INVENTION

The present invention is directed to a composite article having a combination of blast resistance and ballistic resistance. Such composite article is particularly useful for personal protection such as for a helmet or in body armor. U.S. Pat. No. 7,300,893 B2 discloses armor having protection against blast and ballistic damage by encapsulating or sandwiching rigid inclusions or a rigid plate in a high-strain rate hardening elastomer U.S. Pat. No. 7,938,053 B1 discloses visually transparent multilayer armor panels employing a composite including a confined high-strain rate sensitivity-hardening polymer between transparent layers and a further composite which also contains a transparent layer.

U.S. Pat. No. 8,105,510 B1 discloses a stratified composite system of armor which includes a backing of elastomeric matrix material and low-density ceramic elements arranged along a geometric plane.

A need is present for an article having a combination of improved blast resistance and ballistic resistance.

Figure 1A:
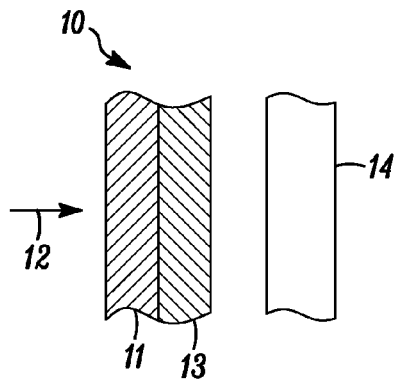
FIG. 1A is a sectional view of a first embodiment of the invention.

In the following sections, numbers in parenthesis pertain to reference numbers in the Figures.

SUMMARY OF THE INVENTION

The present invention is directed to a composite article (10) having improved blast resistance and ballistic resistance comprising (i) a first explosion resistant component (11) facing a blast or ballistic source (12) comprising a high-strain rate hardening elastomeric overlay having a Young's modulus of at least 4000 psi at 400% strain where the overlay may optionally be enhanced through addition of small microparticles (0.002 to 0.04 inches in diameter) or configured into ridges to enhance stiffening and (ii) a second ballistic-resistant component (13) facing an article to be protected (14) comprising at least one layer comprising continuous filament yarns or a non-filamentary polyethylene sheet layer, wherein the continuous filament yarns have a tenacity of at least 15 grams per dtex and a modulus of at least 500 grams per dtex and the oriented polyethylene sheet has a modulus in a first direction that is at least ten times greater than the modulus in a second direction.

The composite article has both blast and ballistic resistance and is particularly suitable for helmets and hard armor articles. Additionally the composite article when employed in many layers is suitable for armor applications. Illustratively the armor can be in the form of a panel.

DETAILED DESCRIPTION OF THE INVENTION

One important use of the article of the present invention is for helmets (30) which synergistically resists high energy threats having both blast and ballistic features. Such threats include cased explosives, bomb (suicide) vests and road-side bombs. However, the articles of the present invention could also be used to resist high energy threats with only ballistic features.

Traumatic brain injury, which occurs due to explosive blast, can occur in a warfighter equipped with a helmet even though such article provides adequate protection against ballistic resistance such as shrapnel. An improved helmet that incorporates significant protection from both shrapnel and blast is needed. There are different theories as to how the blast causes traumatic brain injury. These include compression of the body cavities and generation of vascular pulses transmitted to the brain, explosively-generated piezo-electric charge formation in the bones of the skull, skull flexure, blast-induced cerebral spinal fluid cavitation (coup-countrecoup) and direct pressure pulse transition into the brain. A number of more detailed investigations have been undertaken exploring effects in specific brain structures and regions, e.g. axonal effects in the white matter of the brain or shortening the axonal segment cytoskeleton. Regardless of the underlying mechanism, it is agreed by all that it is important to limit the level of blast exposure to the brain.

Explosion Resistant Component

A necessary component in the present invention is an explosion resistant outer layer (11) which interacts with the underlying inner layer (s) (13) to form a blast-ballistic resistant barrier. The outer layer component is a high-strain rate elastomeric layer having a Young's modulus in a range of from 7000-20000 psi at 100% strain. A narrower range would be from 8000-9000 psi. It is understood that this term "elastomer" can include blends of elastomers and typically could include additives such as an antioxidant.

An additional property of the elastomeric layer is high strain-rate-hardening in the strain rate range of approximately 1000/second to 1,000,000/second in association with a ballistic and/or explosive event.

A suitable elastomer is polyurea alone or together in a blend with polyurethane. Further disclosure of elastomer is present in U.S. Pat. No. 7,300,893 B2.

In some embodiments, the elastomeric layer of the first component further comprises particles having a diameter of from 0.002 to 0.04 inches or even from 0.008 to 0.01 inches. Although the particles may be solid or hollow, solid particles are preferred. Exemplary particles include silicon carbide and glass.

In some other embodiments, the elastomeric layer is configured into two dimensional (2-D) ridges. Preferably the ridges (11a) have a height of about 0.2 inches and the separation between adjacent ridge tops (peaks) is about 0.4 inches. The use of particles or a ridge layer both contribute to enhanced stiffening of the first component.

The term "overlay" as employed herein is understood to mean a separate layer.

Ballistic Resistant Component

Two different embodiments are suitable in combination with the elastomeric layer.

First Embodiment

A first embodiment is directed to a continuous filament yarn having a tenacity of at least 15 grams per dtex and a modulus of at least 500 grams per dtex more preferably at least 18 grams per dtex and a modulus of at least 600 grams per dtex.

The method for measurement of yarn is ATSM D7269 with the yarns having an added twist using a 1.1 twist multiplier.

The yarns are made with filaments of polymer that produces a high-strength fiber, including, for example, polyamides, polyolefins, polyazoles, and mixtures of these.

When the polymer is polyamide, aramid is preferred. The term "aramid" means a polyamide wherein at least 85% of the amide (—CONH—) linkages are attached directly to two aromatic rings. Suitable aramid fibers are described in Man-Made Fibres—Science and Technology, Volume 2, Section titled Fibre-Forming Aromatic Polyamides, page 297, W. Black et al., Interscience Publishers, 1968.

A preferred aramid is a para-aramid. A preferred para-aramid is poly(p-phenylene terephthalamide) which is called PPD-T. By PPD-T is meant a homopolymer resulting from mole-for-mole polymerization of p-phenylene diamine and terephthaloyl chloride and, also, copolymers resulting from incorporation of small amounts of other diamines with the p-phenylene diamine and of small amounts of other diacid chlorides with the terephthaloyl chloride. As a general rule, other diamines and other diacid chlorides can be used in amounts up to as much as about 10 mole percent of the p-phenylene diamine or the terephthaloyl chloride, or perhaps slightly higher, provided only that the other diamines and diacid chlorides have no reactive groups which interfere with the polymerization reaction. PPD-T, also, means copolymers resulting from incorporation of other aromatic diamines and other aromatic diacid chlorides such as, for example, 2,6-naphthaloyl chloride or chloro- or dichloro-terephthaloyl chloride or 3,4'-diaminodiphenylether.

Additives can be used with the aramid and it has been found that up to as much as 10 percent or more, by weight, of other polymeric material can be blended with the aramid. Copolymers can be used having as much as 10 percent or more of other diamine substituted for the diamine of the aramid or as much as 10 percent or more of other diacid chloride substituted for the diacid chloride or the aramid.

Another suitable fiber is one based on aromatic copolyamide prepared by reaction of terephthaloyl chloride (TPA) with a 50/50 mole ratio of p-phenylene diamine (PPD) and 3,4'-diaminodiphenyl ether (DPE). Yet another suitable fiber is that formed by polycondensation reaction of two diamines, p-phenylene diamine and 5-amino-2-(p-aminophenyl) benzimidazole with terephthalic acid or anhydrides or acid chloride derivatives of these monomers.

When the polymer is polyolefin, polyethylene or polypropylene is preferred. The term "polyethylene" means a predominantly linear polyethylene material of preferably more than one million molecular weight that may contain minor amounts of chain branching or comonomers not exceeding 5 modifying units per 100 main chain carbon atoms, and that may also contain and mixed therewith not more than about 50 weight percent of one or more polymeric additives such as alkene-1-polymers, in particular low density polyethylene, propylene, and the like, or low molecular weight additives such as anti-oxidants, lubricants, ultraviolet screening agents, colorants and the like which are commonly incorporated. Such is commonly known as extended chain polyethylene (ECPE) or ultra-high molecular weight polyethylene (UHMWPE).

In some preferred embodiments polyazoles are polyarenazoles such as polybenzazoles and polypyridazoles. Suitable polyazoles include homopolymers and, also, copolymers. Additives can be used with the polyazoles and up to as much as 10 percent, by weight, of other polymeric material can be blended with the polyazoles. Also copolymers can be used having as much as 10 percent or more of other monomer substituted for a monomer of the polyazoles. Suitable polyazole homopolymers and copolymers can be made by known procedures.

Preferred polybenzazoles are polybenzimidazoles, polybenzothiazoles, and polybenzoxazoles and more preferably such polymers that can form fibers having yarn tenacities of 30 gpd or greater. If the polybenzazole is a polybenzothioazole, preferably it is poly(p-phenylene benzobisthiazole). If the polybenzazole is a polybenzoxazole, preferably it is poly(p-phenylene benzobisoxazole) and more preferably poly(p-phenylene-2,6-benzobisoxazole) called PBO.

Preferred polypyridazoles are polypyridimidazoles, polypyridothiazoles, and polypyridoxazoles and more preferably such polymers that can form fibers having yarn tenacities of 30 gpd or greater. In some embodiments, the preferred polypyridazole is a polypyridobisazole. A preferred poly(pyridobisozazole) is poly(1,4-(2,5-dihydroxy)phenylene-2,6-pyrido[2,3-d:5,6-d']bisimidazole which is called PIPD. Suitable polypyridazoles, including polypyridobisazoles, can be made by known procedures.

It is understood that layer is employed in its normal definition and would not include encapsulation of another layer Second Embodiment A second embodiment for use in combination with the elastomeric layer or overlay is an oriented polyethylene layer which has a modulus in a first direction that is a least ten times greater than a modulus in a second direction.

Oriented polyethylene includes ultra-high molecular weight polyethylene (UHMWPE).

By UHMWPE is meant film made from a polyethylene polymer having a viscosity average molecular weight of at least 2 million. In some embodiments the molecular weight is between 2-6 million or even 3-5 million. More preferably the viscosity average molecular weight at least 4 million. An example of a suitable polyethylene material is HSBD30A Bidirectional Laminate from E. I. DuPont de Nemours and Company. This material is a bi-directional cross-plied material made from alternate layers of UHMW polyethylene tape and adhesive.

Such layer is non-filamentary and is highly oriented. By highly oriented is meant that the modulus in one direction, normally the direction in which the oriented film monolayer is produced, is at least 10 times greater than in any other direction. Preferably, the modulus in one direction is a least 20 times greater and more preferably at least 30 times greater than in any other direction. Suitable adhesives to bond alternate layers can include commercially available nonwoven fabric such as made form low melting point polyethylene or a layer of commercially available adhesive such as styrene-butadiene-styrene block copolymer.

It is understood layer is employed in its normal definition and would not include encapsulation of another layer.

Optional Layers

It is within the scope of the present invention that multiple layers be present in addition to the two layer construction set forth above.

Figure 1B:
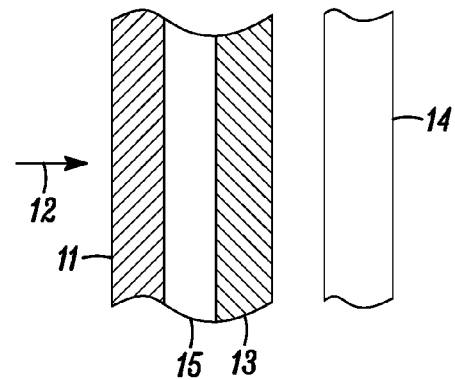
FIG. 1B is a sectional view of a second embodiment of the invention.
Figure 1C:
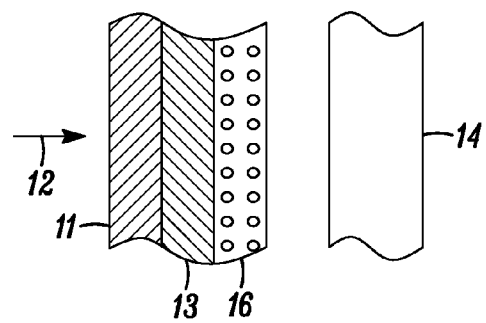
FIG. 1C is a sectional view of a third embodiment of the invention.
Figure 2A:
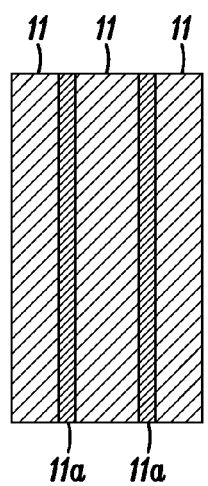
FIG. 2A is a plan view of the explosion resistant component comprising ridges.
Figure 2B:
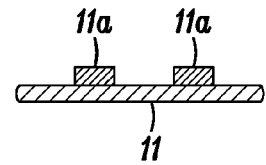
FIG. 2B is an end view of the explosion resistant component comprising ridges.
Figure 3A:
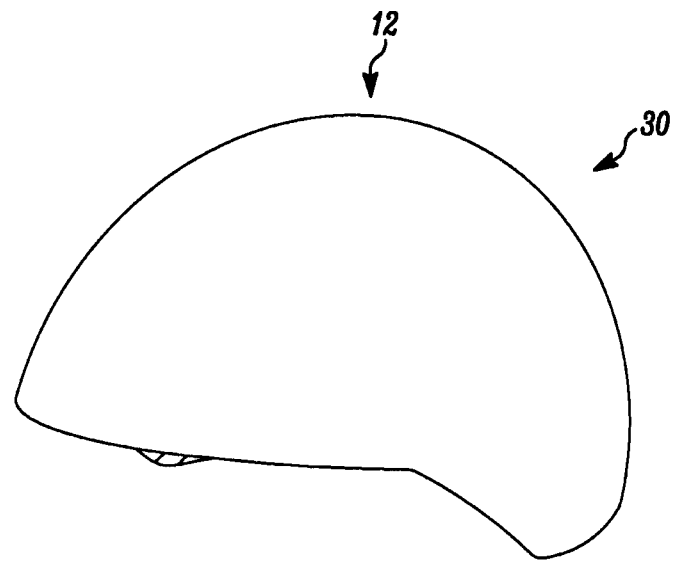
FIG. 3A is a first view of a ballistic-resistant helmet helmet.
Figure 3B:
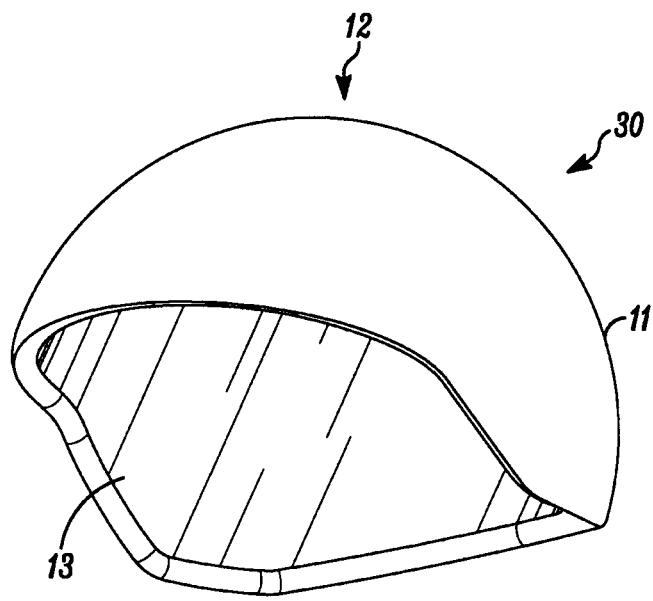
FIG. 3B is a second view of a ballistic-resistant helmet helmet showing both the explosion and blast-resistant components.

Illustratively multiple layers of the present invention could be adhered together with an adhesive. A suitable embodiment, as in FIG. 1B, is an optional third component (15) positioned between the first (11) and second (13) component comprising at least one layer of continuous filament yarns or at least one layer of a non-filamentary oriented polyethylene sheet. Another suitable embodiment, as in FIG. 1C, is an optional fourth component (16) positioned between the second component (13) and an article to be protected (14) comprising at least one layer of continuous filament yarns or at least one layer of a non-filamentary oriented polyethylene sheet. If either an optional third component (15) and/or an optional fourth component (16) were used in the construction of the ballistic second component, the ballistic component would be considered a 'hybrid' component, and would still be combined with the blast resistant first component (11) described above.

To further illustrate the present invention the following examples are provided. All commercial materials were used as received unless otherwise indicated.

EXAMPLES

The following abbreviations are used: "° C." is degrees Celsius, "° F." is degrees Fahrenheit, "gn" is grain, "m" is meter, "s" is second, "psf" is pounds per square foot, "lbs/ft$^2$" is also pounds per square foot, "fps" is feet per second", "ft/s" is also feet per second, "cm" is centimeter, "mm" is millimeter, "g" is gram, "kg" is kilogram, "gpd" is grams per denier, "AD" is areal density, "wt" is weight, "wt %" means weight percent, "cPs" is centipoise, "psi-ms" is pounds per square inch millisecond, "kg/cm$^2$-ms" is kilograms per square centimeter milliseconds, "G" is the Gravitational constant, "m/s$^2$" is meters per square second, "W/in$^2$" is Watts per square inch, "W/cm$^2$" is Watts per square centimeter, "Comp. Ex." is Comparative Example.

Materials—Kevlar® Composite Shell—Kevlar®/PVB-Phenolic Prepreg:

Comparative Example B and Examples 1-4 used plies of Kevlar®/PVB-Phenolic prepreg, composite ballistic fabric impregnated with resin. The plies comprised (a) a plain weave woven fabric of 850 denier poly(p-phenylene terephthalamide) yarn, available form E.I. du Pont de Nemours and Company (Wilmington, Del.) (DuPont) under the trade name of Kevlar® para-aramid brand yarn woven at 12.2×12.2 ends per centimeter (31×31 ends per inch) in both warp and weft and (b) a thermosetting matrix resin consisting of polyvinyl butyral (PVB) and phenolic components. The yarns of the fabric had a nominal yarn tenacity of 27.5 grams per denier (gpd) and a nominal yarn modulus of 580 gpd. The nominal areal weight of the fabric was 230 g/m$^2$. The matrix resin content was 10-13 wt % based on the total weight of fabric plus matrix resin.

Materials—Kevlar® Composite Shell—Kevlar® XP™ H170:

Comparative Example C and Examples 1-11 used plies of Kevlar® XP™ H170 composite ballistic fabric impregnated with resin. The plies comprised (a) a plain weave woven fabric of 600 denier (660 dtex) poly(p-phenylene terephthalamide) yarn, available form E.I. du Pont de Nemours and Company (Wilmington, Del.) (DuPont) under the trade name of Kevlar® para-aramid brand KM2 yarn woven at 11.4×11.4 ends per centimeter (29×29 ends per inch) and (b) a thermoplastic matrix resin consisting of a highly neutralized ionomer that had essentially no melt flow which was coated as an aqueous colloid of the ionomer on one side of the Kevlar® fabric and dried, as described in detail in published patent application US 2011/0117351(A1). The yarns of the fabric had a nominal yarn tenacity of 28 grams per denier (gpd) and a nominal yarn modulus of 630 gpd. The nominal areal weight of the fabric was 149 g/m$^2$. The matrix resin content was 10-13 wt % based on the total weight of fabric plus matrix resin. A single product incorporating the above characteristics is available from DuPont under the trade name Kevlar® XP™ H170.

Materials—Explosion Resistant Coatings—Versalink P-1000:

Examples 1, 2, 3, 7, 8, 9 and 10 used an oligomeric diamine as at least part of the Explosion Resistant Coating (ERC) layer. This material is a polyurethane, and more specifically a Polyurea, and more specifically a polytetramethyleneoxide-di-p-aminobenzoate. This material is an amber liquid at ambient temperature, has dynamic viscosity of 3000 cPs maximum at 40° C., a specific gravity of 1.01-1.06 at 20° C. A single product incorporating the above characteristics is available from Air Products under the trade name Versalink P-1000.

Materials—Explosion Resistant Coatings—Versalink P-250:

Examples 3 and 11 also used an oligomeric diamine curative as at least part of the Explosion Resistant Coating (ERC) layer. This material is a polyurethane, and more specifically a Polyurea. This material is an amber waxy solid at ambient temperature, has dynamic viscosity of <300 cPs at 85° C., a specific gravity of 0.98 at 25° C. A single product incorporating the above characteristics is available from Air Products under the trade name Versalink P-250.

Materials—Explosion Resistant Coatings—Isonate 143L:

Examples 1, 2, 3, 7, 8, 9, 10, and 11 used a curative as at least part of the Explosion Resistant Coating (ERC) layer. This material is a Methylene Diphenyl Diisocyanate (MDI), and more specifically a polycarbodiimide-modified diphenylmethane diisocyanate. This material is a liquid at ambient temperature, has viscosity of 33 cPs at 25° C., a specific gravity of 1.214 at 25° C., and an appropriate. This material is primarily used to assist the curing of the other materials used as the Explosion Resistant Coating. A single product incorporating the above characteristics is available from Dow Chemical under the trade name Isonate 143L.

Materials—Explosion Resistant Coatings—HybridSil:

Examples 4, 5 and 6 used a fire retardant and explosion resistant coating as at least part of the Explosion Resistant Coating (ERC) layer. This material is a polysiloxane, and is the product of a two part resin system, and a characteristic material is available from Nanosonic under the trade name HybridSil.

Processing—Kevlar® Composite Helmet Shell—100% Kevlar®/PVB-Phenolic:

Comparative Example B used a composite shell made of 100% Kevlar®/PVB-Phenolic prepreg as described above. The desired plies were cut to a size and shape suitable for preparing a preform for a composite helmet shell using standard techniques known in the industry. The 100% Kevlar®/PVB-Phenolic preforms were made using 40 plies of the prepreg material. The preform was placed in a compression molding press to undergo a consolidation procedure in which the plies were consolidated into the helmet shell geometry. Consolidation took place at a temperature of 160° C. (320° F.), under a press force of 200 Tons, for a time of 15 minutes under heat. In addition, four one-minute bump cycles (40 seconds, closed, 20 seconds open, 60 seconds total duration each) were incorporated into the beginning of the cycle to accommodate offgassing associated with the PVB-Phenolic based resin material. With the exception of the bump cycles, the 200 Tons press force was maintained on the layup during the entire process. The helmet was then removed from the mold while still hot, allowed to cool to ambient temperature, and analyzed. After processing, the helmet was cut down to contours approximating the geometry of an ACH helmet shell with a secondary operation using a band saw.

Processing—Kevlar® Composite Helmet Shell—Kevlar®/PVB-Phenolic & Kevlar® XP™ H170 Light Weight Hybrids:

Examples 1-4 used a composite shell made of a hybrid design consisting of nominally 55% by weight of the Kevlar®/PVB-Phenolic prepreg as described above and nominally 45% by weight of the Kevlar® XP™ H170 prepreg also described above. The desired plies were cut to a size and shape suitable for preparing a preform for a composite helmet shell using standard techniques known in the industry. The hybrid preforms were made using 18 plies of the Kevlar®/PVB-Phenolic prepreg material and 22 plies of the Kevlar® XP™ H170 thermoplastic prepreg material. Further, the preforms were laid up such that the Kevlar®/PVB-Phenolic material was placed both outside and inside of the Kevlar® XP™ H170 material, creating a sandwich-like structure. The preform was placed in a compression molding press to undergo a consolidation procedure in which the plies were consolidated into the helmet shell geometry. Consolidation took place at a temperature of 160° C. (320° F.), under a press force of 500 Tons, for a time of 15 minutes under heat. In addition, four one-minute bump cycles (40 seconds, closed, 20 seconds open, 60 seconds total duration each) were incorporated into the beginning of the cycle to accommodate offgassing associated with the PVB-Phenolic based resin material. In addition, a cooling cycle was incorporated at the end of the cycle to accommodate the thermoplastic nature of the resin used in the Kevlar® XP™ H170 material. With the exception of the bump cycles, the 500 Tons press force was maintained on the layup during the entire process including the cooling phase. The helmet was then removed from the mold already cooled down to ambient temperature, and analyzed. After processing, the helmet was cut down to contours approximating the geometry of an ACH helmet shell with a secondary operation using a band saw. Helmet shells made using this design are believed to have equivalent ballistic performance to the 100% Kevlar®/PVB-Phenolic helmet shells described above, even at a weight savings of nominally 8 ounces or more.

Processing—Kevlar® Composite Panels—Kevlar® XP™ H170:

Comparative Example C and Examples 5-11 used a composite backing panel made of the Kevlar® XP™ H170 prepreg described above. The plies were counted out to make Kevlar® composite backing panels of either nominally 1.5 psf (7.33 kg/m$^2$), 1.7 psf (8.31 kg/m$^2$), or 2.0 psf (9.79 kg/m$^2$). The desired plies were cut to a size of 12"×12" (30 cm×30 cm) squares and prepared for consolidation using standard techniques known in the industry. The panel was placed in a compression molding press to undergo a consolidation procedure. Consolidation took place at a temperature of 160° C. (320° F.), under a press force of 324 Tons, for a time of 15 minutes under heat. In addition, a cooling cycle was incorporated at the end of the cycle to accommodate the thermoplastic nature of the resin used in the Kevlar® XP™ H170 material. The 324 Tons press force was maintained on the layup during the entire process including the cooling phase. The panel was then removed from the press already cooled down to ambient temperature, and analyzed.

Processing—Explosion Resistant Coatings (ERC) for Blast Resistance:

Examples 1-4 used Explosion Resistant Coatings on the outside and/or inside of the light weight hybrid Kevlar® composite helmet shells described above. Since the light weight hybrid helmet shells were nominally 8 ounces lighter than the 100% Kevlar®/PVB-Phenolic control helmet shell design, the ERC coating was added at a target 8 ounce coating weight over the entire surface area to be coated, thus essentially equaling the weight of the control design. Examples 5-11 used Explosion Resistant Coatings disposed on the strike face of the Kevlar® XP H170 flat panel backings described above. Since the light weight flat panel backings were nominally 1.5 psf (7.33 kg/m$^2$) or 1.7 psf (8.31 kg/m$^2$), the ERC coating was added at either a target of 0.5 psf (2.44 kg/m$^2$) or 0.3 psf (1.46 kg/m$^2$) uniformly coated over the entire surface area to be coated, thus essentially equaling the weight of the control design in Comparative Example C of 2.0 psf (9.79 kg/m2). In the cases where the ERC coating used was Versalink P-1000 described above and/or the Versalink P-250 described above, the ERC cure was modified with the use of the Isonate 143L described above, and the mixture was applied manually to the intended surface to be coated. In the cases where the ERC coating used was the HybridSil Fire Retardant Coating, the two-part resin mixture was applied directly by the manufacturer using a spray coating technique common in the industry. In some cases the ERC coating was applied to the outside or external surface of the helmet or panel, and in some cases, the ERC coating was applied to the inside or internal surface or back face of the helmet or panel. In all cases, the ERC coatings were allowed to reach a fully cured state, and the now coated helmet shells were analyzed again Analytical Methods—Ballistic Penetration Performance:

Comparative Example B and Examples 1-4 were all evaluated for ballistic penetration performance. Ballistic performance was conducted in accordance with standard procedure MIL-STD-662-F (V50 Ballistic Test for Armor) with the exception that 16 Grain Right Circular Cylinder (RCC) fragment simulating projectiles were used. For each Example and Comparative Example, one coated or uncoated helmet shell was used as the target with up to ten shots fired at it, at zero degree obliquity. The reported V50 values are average values for the number of pairs of partial and complete penetrations achieved for each example. V50 is a statistical measure that identifies the average velocity at which a bullet or a fragment penetrates the target or armor equipment in 50% of the shots, versus non-penetration of the other 50%. The parameter measured is V50 at zero degrees where the degree angle refers to the obliquity of the projectile to the target.

Analytical Methods—Blast Mitigation Performance:

Comparative Example B and Examples 1-4 were all evaluated for blast mitigation performance. Headforms were designed to simulate aspects of the response of the human head. For each blast event, one headform was equipped with accelerometers, and one headform was equipped with pressure gages, at various locations to collect acceleration and pressure data during the blast events. Thus, each coated and un-coated helmet would be blast tested a total of two times to gather the full set of data desired. For each blast event described in the examples below, the accelerometers used were chosen to be considered as located in the brain (3 inches down from the top of the skull, 2.5 inches back from the front of the face, and midway, approximately 2.75 inches, between the ears) and in the brain stem (5 inches down from the top of the skull, 5.5 inches back from the front of the face, and midway, approximately 2.75 inches, between the ears), and the pressure gage used was located near the back corner of the helmet (3.75 inches down from the top of the skull, 4.75 inches back from the front of the face, and 1.5 inches inward from the plane of the ear closest to the oncoming blast wave). Helmet shells were equipped with a padding and suspension system, utilizing ¾" thick foam pads, and a suspension system.

Comparative Example C and Examples 5-11 were also evaluated for blast mitigation performance, as flat panels. In these cases, no headforms or padding/suspension systems were needed, and the accelerometers described above were placed directly behind the panels (relative to the direction of the blast source) in the center of the panel. For each blast event described in the examples below, charge and standoff are adjusted to produce pressure levels related to significant potential for injury. After each blast case was run experimentally, the results were analyzed. The accelerometers provided readings of the peak acceleration and thereby the velocity of the headform during the helmet tests at the two locations described above or the panel at the behind center panel during the blast event. The pressure gages used in the helmet tests provided readings of the pressure versus time over the duration of the blast impact at the locations described above. The impulse of the blast event was computed as the cumulative pressure observed over the time duration of the blast event. Impulse and accelerations of sufficient magnitude have been linked to brain injury.

Comparative Example A

This example is a baseline for the blast event with no additional mitigation provided by a helmet, either coated or un-coated. The instrumented headforms were baseline tested against the blast event as described above. Results are provided in Table 1.

Comparative Example B

A first helmet sample of this example was made using the 100% Kevlar®/PVB-Phenolic design and process as described above. The Kevlar® composite shell had a weight of 1.139 kg (2.510 lb) after processing. The shell was not coated with an Explosion Resistant Coating. This helmet sample was tested for ballistic performance as described above. Results are provided in Table 1.

A second helmet sample of this example was made and intended to be a replicate of the first helmet sample of this example. This second helmet sample was also made using the 100% Kevlar®/PVB-Phenolic design and process as described above. The Kevlar® composite shell had a weight of 1.139 kg (2.510 lb) after processing. The shell was not coated with an Explosion Resistant Coating. This helmet sample was tested for blast mitigation performance as described above. Results are provided in Table 1.

Example 1

A first helmet sample of this example was made using the light weight hybrid design and process as described above. The Kevlar® composite shell had a weight of 0.850 kg (1.874 lb) after processing. The shell was then coated with the Versalink P-1000 ERC, cured with the Isonate 143L, and applied as described above, in this case to the outer surface of the helmet. The coated helmet had a weight of 1.178 kg (2.598 lb) after coating. This helmet sample was tested for ballistic performance as described above. Results are provided in Table 1.

A second helmet sample of this example was made and intended to be a replicate of the first helmet sample of this example. This second helmet sample was also made using the light weight hybrid design and process as described above. The Kevlar® composite shell had a weight of 0.851 kg (1.876 lb) after processing. The shell was then also coated with the Versalink P-1000 ERC, cured with the Isonate 143L, and applied as described above, in this case also to the outer surface of the helmet. The coated helmet had a weight of 1.185 kg (2.612 lb) after coating. This helmet sample was tested for blast mitigation performance as described above. Results are provided in Table 1.

Example 2

A first helmet sample of this example was made using the light weight hybrid design and process as described above. The Kevlar® composite shell had a weight of 0.855 kg (1.884 lb) after processing. The shell was then coated with the Versalink P-1000 ERC, cured with the Isonate 143L, and applied as described above, in this case to the inner surface of the helmet. The coated helmet had a weight of 1.208 kg (2.664 lb) after coating. This helmet sample was tested for ballistic performance as described above. Results are provided in Table 1.

A second helmet sample of this example was made and intended to be a replicate of the first helmet sample of this example. This second helmet sample was also made using the light weight hybrid design and process as described above. The Kevlar® composite shell had a weight of 0.854 kg (1.882 lb) after processing. The shell was then also coated with the Versalink P-1000 ERC, cured with the Isonate 143L, and applied as described above, in this case also to the inner surface of the helmet. The coated helmet had a weight of 1.212 kg (2.672 lb) after coating. This helmet sample was tested for blast mitigation performance as described above. Results are provided in Table 1.

Example 3

A first helmet sample of this example was made using the light weight hybrid design and process as described above. The Kevlar® composite shell had a weight of 0.851 kg (1.876 lb) after processing. The shell was then coated with a blend of the Versalink P-1000 ERC and the Versalink P-250 ERC, cured with the Isonate 143L, and applied as described above, in this case to the outer surface of the helmet. The coated helmet had a weight of 1.182 kg (2.606 lb) after coating. This helmet sample was tested for ballistic performance as described above. Results are provided in Table 1.

A second helmet sample of this example was made and intended to be a replicate of the first helmet sample of this example. This second helmet sample was also made using the light weight hybrid design and process as described above. The Kevlar® composite shell had a weight of 0.855 kg (1.884 lb) after processing. The shell was then also coated with a blend of the Versalink P-1000 ERC and the Versalink P-250 ERC, cured with the Isonate 143L, and applied as described above, in this case also to the outer surface of the helmet. The coated helmet had a weight of 1.219 kg (2.688 lb) after coating. This helmet sample was tested for blast mitigation performance as described above. Results are provided in Table 1.

Example 4

A first helmet sample of this example was made using the light weight hybrid design and process as described above. The Kevlar® composite shell had a weight of 0.852 kg (1.878 lb) after processing. The shell was then coated with the HybridSil Fire Retardant and Explosion Resistant Coating, and applied as described above, in this case to the outer surface of the helmet. The coated helmet had a weight of 1.144 kg (2.522 lb) after coating. This helmet sample was tested for ballistic performance as described above. Results are provided in Table 1.

A second helmet sample of this example was made and intended to be a replicate of the first helmet sample of this example. This second helmet sample was also made using the light weight hybrid design and process as described above. The Kevlar® composite shell had a weight of 0.852 kg (1.878 lb) after processing. The shell was then also coated with the HybridSil Fire Retardant Coating, and applied as described above, in this case also to the outer surface of the helmet. The coated helmet had a weight of 1.152 kg (2.540 lb) after coating. This helmet sample was tested for blast mitigation performance as described above. Results are provided in Table 1.

Comparative Example C

A first panel sample of this example was made using the Kevlar® XP H170 design and process as described above. The Kevlar® composite panel had an areal weight of 9.83 kg/m2 (2.010 psf) after processing. The panel was not coated with an Explosion Resistant Coating. This panel sample was tested for ballistic performance as described above. Results are provided in Table 2.

A second panel sample of this example was made and intended to be a replicate of the first panel sample of this example. This second panel sample was also made using the Kevlar® XP H170 design and process as described above. The Kevlar® composite panel had an areal weight of 9.79 kg/m2 (2.001 psf) after processing. The panel was not coated with an Explosion Resistant Coating. This panel sample was also tested for ballistic performance as described above. Results are provided in Table 2.

A third panel sample of this example was made and intended to be a replicate of the first and second panel samples of this example. This third panel sample was also made using the Kevlar® XP H170 design and process as described above. The Kevlar® composite panel had an areal weight of 9.96 kg/m2 (2.038 psf) after processing. The panel was not coated with an Explosion Resistant Coating. This panel sample was tested for blast mitigation performance as described above. Results are provided in Table 2.

Example 5

A first panel sample of this example was made using the Kevlar® XP H170 design and process described above. The Kevlar® composite panel had a nominal areal weight of 8.31 kg/m2 (1.7 psf) after processing. The panel was then coated with the HybridSil Fire Retardant Coating, and applied as described above, in this case to the strike face of the panel. The coated panel had an areal weight of 9.57 kg/m2 (1.958 psf) after coating. This panel sample was tested for ballistic performance as described above. Results are provided in Table 2.

A second panel sample of this example was made and intended to be a replicate of the first panel sample of this example. This second panel sample was also made using the Kevlar® XP H170 design and process as described above. The Kevlar® composite panel had a nominal areal weight of 8.31 kg/m2 (1.7 psf) after processing. The panel was then also coated with the HybridSil Fire Retardant Coating, and applied as described above, in this case also to the strike face of the panel. The coated panel had an areal weight of 9.25 kg/m2 (1.891 psf) after coating. This helmet sample was tested for blast mitigation performance as described above. Results are provided in Table 2.

Example 6

A first panel sample of this example was made using the Kevlar® XP H170 design and process described above. The Kevlar® composite panel had a nominal areal weight of 7.33 kg/m2 (1.5 psf) after processing. The panel was then coated with the HybridSil Fire Retardant Coating, and applied as described above, in this case to the strike face of the panel. The coated panel had an areal weight of 9.19 kg/m2 (1.880 psf) after coating. This panel sample was tested for ballistic performance as described above. Results are provided in Table 2.

A second panel sample of this example was made and intended to be a replicate of the first panel sample of this example. This second panel sample was also made using the Kevlar® XP H170 design and process as described above. The Kevlar® composite panel had a nominal areal weight of 7.33 kg/m2 (1.5 psf) after processing. The panel was then also coated with the HybridSil Fire Retardant Coating, and applied as described above, in this case also to the strike face of the panel. The coated panel had an areal weight of 9.45 kg/m2 (1.933 psf) after coating. This helmet sample was tested for blast mitigation performance as described above. Results are provided in Table 2.

Example 7

A first panel sample of this example was made using the Kevlar® XP H170 design and process described above. The Kevlar® composite panel had a nominal areal weight of 8.31 kg/m2 (1.7 psf) after processing. The panel was then coated with the Versalink P-1000 ERC, cured with the Isonate 143L, and applied as described above, in this case to the strike face of the panel. Within the ERC coating layer of this panel, six (6) layers of 0.05 mm (0.002") Aluminum sheet were inserted at roughly equal spacing through the thickness of the coating, with approximately 0.076 mm (0.003") of the polymer coating between each Aluminum layer. The coated panel had an areal weight of 9.91 kg/m2 (2.028 psf) after coating. This panel sample was tested for ballistic performance as described above. Results are provided in Table 2.

A second panel sample of this example was made and intended to be a replicate of the first panel sample of this example. This second panel sample was also made using the Kevlar® XP H170 design and process described above. The Kevlar® composite panel had a nominal areal weight of 8.31 kg/m2 (1.7 psf) after processing. The panel was then coated with the Versalink P-1000 ERC, cured with the Isonate 143L, and applied as described above, in this case to the strike face of the panel. Within the ERC coating layer of this panel, six (6) layers of 0.05 mm (0.002") Aluminum sheet were inserted at roughly equal spacing through the thickness of the coating, with approximately 0.076 mm (0.003") of the polymer coating between each Aluminum layer. The coated panel had an areal weight of 9.80 kg/m2 (2.004 psf) after coating. This panel sample was also tested for ballistic performance as described above. Results are provided in Table 2.

A third panel sample of this example was made and intended to be a replicate of the first and second panel samples of this example. This third panel sample was also made using the Kevlar® XP H170 design and process described above. The Kevlar® composite panel had a nominal areal weight of 8.31 kg/m2 (1.7 psf) after processing. The panel was then coated with the Versalink P-1000 ERC, cured with the Isonate 143L, and applied as described above, in this case to the strike face of the panel. Within the ERC coating layer of this panel, six (6) layers of 0.05 mm (0.002") Aluminum sheet were inserted at roughly equal spacing through the thickness of the coating, with approximately 0.076 mm (0.003" of the polymer coating between each Aluminum layer. The coated panel had an areal weight of 9.77 kg/m2 (1.998 psf) after coating. This panel sample was tested for blast mitigation performance as described above. Results are provided in Table 2.

Example 8

A first panel sample of this example was made using the Kevlar® XP H170 design and process described above. The Kevlar® composite panel had a nominal areal weight of 7.33 kg/m2 (1.5 psf) after processing. The panel was then coated with the Versalink P-1000 ERC, cured with the Isonate 143L, and applied as described above, in this case to the strike face of the panel. Within the ERC coating layer of this panel, three (3) layers of 0.2 mm (0.008") of Aluminum sheet were inserted at roughly equal spacing through the thickness of the coating, with approximately 0.178 mm (0.007") of the polymer coating between each Aluminum layer. The coated panel had an areal weight of 9.65 kg/m2 (1.974 psf) after coating. This panel sample was tested for ballistic performance as described above. Results are provided in Table 2.

A second panel sample of this example was made and intended to be a replicate of the first panel sample of this example. This second panel sample was also made using the Kevlar® XP H170 design and process described above. The Kevlar® composite panel had a nominal areal weight of 7.33 kg/m2 (1.5 psf) after processing. The panel was then coated with the Versalink P-1000 ERC, cured with the Isonate 143L, and applied as described above, in this case to the strike face of the panel. Within the ERC coating layer of this panel, three (3) layers of 0.2 mm (0.008") layers of Aluminum sheet were inserted at roughly equal spacing through the thickness of the coating, with approximately 0.178 mm (0.007") of the polymer coating between each Aluminum layer. The coated panel had an areal weight of 9.83 kg/m2 (2.011 psf) after coating. This panel sample was also tested for blast mitigation performance as described above. Results are provided in Table 2.

Example 9

A first panel sample of this example was made using the Kevlar® XP H170 design and process described above. The Kevlar® composite panel had an areal weight of 8.28 kg/m2 (1.694 psf) after processing. The panel was then coated with the Versalink P-1000 ERC, cured with the Isonate 143L, and applied as described above, in this case to the strike face of the panel. Within the ERC coating layer of this panel, 1 mm (0.039") nominal diameter Silicon Carbide spheres were mixed in with the ERC coating, dispersed uniformly throughout the ERC coating, at a SiC weight ratio of 33% to 67% polymer weight ratio. The coated panel had an areal weight of 9.72 kg/m2 (1.988 psf) after coating. This panel sample was tested for ballistic performance as described above. Results are provided in Table 2.

Example 10

A first panel sample of this example was made using the Kevlar® XP H170 design and process described above. The Kevlar® composite panel had a nominal areal weight of 7.33 kg/m2 (1.5 psf) after processing. The panel was then coated with the Versalink P-1000 ERC, cured with the Isonate 143L, and applied as described above, in this case to the strike face of the panel. Within the ERC coating layer of this panel, 1 mm (0.039") nominal diameter Silicon Carbide spheres were mixed in with the ERC coating, dispersed uniformly throughout the ERC coating, at a SiC weight ratio of 33% to 67% polymer weight ratio. The coated panel had an areal weight of 9.79 kg/m2 (2.002 psf) after coating. This panel sample was tested for ballistic performance as described above. Results are provided in Table 2.

A second panel sample of this example was made and intended to be a replicate of the first panel sample of this example. This second panel sample was also made using the Kevlar® XP H170 design and process described above. The Kevlar® composite panel had a nominal areal weight of 7.33 kg/m2 (1.5 psf) after processing. The panel was then coated with the Versalink P-1000 ERC, cured with the Isonate 143L, and applied as described above, in this case to the strike face of the panel. Within the ERC coating layer of this panel, 1 mm (0.039") nominal diameter Silicon Carbide spheres were mixed in with the ERC coating, dispersed uniformly throughout the ERC coating, at a SiC weight ratio of 33% to 67% polymer weight ratio. The coated panel had an areal weight of 9.84 kg/m2 (2.012 psf) after coating. This panel sample was also tested for blast mitigation performance as described above. Results are provided in Table. In addition, this same panel was also tested a second time for blast mitigation performance as described above. Results are provided in Table 2.

Example 11

A first panel sample of this example was made using the Kevlar® XP H170 design and process described above. The Kevlar® composite panel had a nominal areal weight of 7.33 kg/m2 (1.5 psf) after processing. The panel was then coated with the Versalink P-1000 ERC, cured with the Isonate 143L, and applied as described above, in this case to the strike face of the panel. The ERC coating layer of this panel was coated with a geometric feature, which was coated flush against the Kevlar® composite panel and had a ribbed texture with the "ribs" features spaced nominally 1.27 cm (½") apart with the peaks nominally 0.30-0.38 cm (0.120-0.150") thicker than the rest of the coating thickness. The coated panel had an areal weight of 10.64 kg/m2 (2.177 psf) after coating. This panel sample was tested for ballistic performance as described above. Results are provided in Table 2.

A second panel sample of this example was made and intended to be a replicate of the first panel sample of this example. This second panel sample was also made using the Kevlar® XP H170 design and process described above. The Kevlar® composite panel had a nominal areal weight of 7.33 kg/m2 (1.5 psf) after processing. The panel was then coated with the Versalink P-1000 ERC, cured with the Isonate 143L, and applied as described above, in this case to the strike face of the panel. The ERC coating layer of this panel was coated with a geometric feature, which was coated flush against the Kevlar® composite panel and had a ribbed texture with the "ribs" features spaced nominally 1.27 cm (½") apart with the peaks nominally 0.30-0.38 cm (0.120-0.150") thicker than the rest of the coating thickness. The coated panel had an areal weight of 9.82 kg/m2 (2.009 psf) after coating. This panel sample was also tested for blast mitigation performance as described above. Results are provided in Table 2. In addition, this same panel was also tested a second time for blast mitigation performance as described above. Results are provided in the following Table 2.

TABLE 1

| | Helmet Shell Material Descriptions | | Helmet Shell Weights | | | | Ballistic Testing Results | Blast Testing Results | | |
|---|---|---|---|---|---|---|---|---|---|---|
| | Ballistic Resistant Composite Shell | Blast/Explosion Resistant Coating (ERC) | Composite Shell Before Coating | | ERC Coated Shell After Coating | | 16 grain RCC V50 % of Example B | Acceleration Location | Impulse at Closest Pressure Gage % of Example A | Acceleration % of Example A |
| | | | lbs | kg | lbs | kg | | | | |
| A | No Helmet | No Coating | — | — | — | — | — | — | — | — |
| | | | — | — | — | — | — | In Brain | 100 | 100 |
| | | | | | | | | Brain Stem | 100 | 100 |
| B | Kevlar ® PVB-Phenolic Prepreg (100%) | No Coating | 2.510 | 1.139 | — | — | 100 | — | — | — |
| | | | 2.510 | 1.139 | — | — | — | In Brain | 84 | 61 |
| | | | | | | | | Brain Stem | 84 | 85 |
| 1 | Kevlar ® PVB-Phenolic Prepreg (55%), Kevlar ® XP H170 (45%) | Air Products Versalink P1000, Isonate 143L Cured, Outside Coating | 1.874 | 0.850 | 2.598 | 1.178 | 109 | — | — | — |
| | | | 1.876 | 0.851 | 2.612 | 1.185 | — | In Brain | 81 | 57 |
| | | | | | | | | Brain Stem | 81 | 94 |
| 2 | Kevlar ® PVB-Phenolic Prepreg (55%), Kevlar ® XP H170 (45%) | Air Products Versalink P1000, Isonate 143L Cured, Inside Coating | 1.884 | 0.855 | 2.664 | 1.208 | 79 | — | — | — |
| | | | 1.882 | 0.854 | 2.672 | 1.212 | — | In Brain | 96 | 55 |
| | | | | | | | | Brain Stem | 96 | 77 |
| 3 | Kevlar ® PVB-Phenolic Prepreg (55%), Kevlar ® XP H170 (45%) | Air Products Versalink P1000 and P250 Blend, Isonate 143L Cured, Outside Coating | 1.876 | 0.851 | 2.606 | 1.182 | 107 | — | — | — |
| | | | 1.884 | 0.855 | 2.688 | 1.219 | — | In Brain | 82 | 68 |
| | | | | | | | | Brain Stem | 82 | 77 |
| 4 | Kevlar ® PVB-Phenolic Prepreg (55%), Kevlar ® XP H170 (45%) | NanoSonic HybridSil, Polysiloxane-based Polymer, Outside Coating | 1.878 | 0.852 | 2.522 | 1.144 | 103 | — | — | — |
| | | | 1.878 | 0.852 | 2.540 | 1.152 | — | In Brain | 71 | 67 |
| | | | | | | | | Brain Stem | 71 | 93 |

TABLE 2

| | Flat Panel Material Descriptions | | Flat Panel Areal Densities | | | | Ballistic Testing Results 16 grain RCC V50 % Example C | Blast Testing Results | | |
|---|---|---|---|---|---|---|---|---|---|---|
| | Ballistic Resistant Composite Backing | Blast/Explosion Resistant Coating (ERC) | Ballistic Composite Backing Before Coating | | ERC Coated Article After Coating | | | Accelerometer Location | Acceleration % of Example C | Velocity % of Example C |
| | | | psf | kg/m² | psf | kg/m² | | | | |
| C | Kevlar ® XP H170 | No Coating | 2.010 | 9.83 | — | — | 100 | — | — | — |
| | Kevlar ® XP H170 | No Coating | 2.002 | 9.79 | — | — | 97 | — | — | — |
| | Kevlar ® XP H170 | No Coating | 2.038 | 9.96 | — | — | — | Center Behind Panel | 100 | 100 |
| 5 | Kevlar ® XP H170 | NanoSonic HybridSil | 1.7 | 8.31 | 1.958 | 9.57 | 94 | — | — | — |
| | Kevlar ® XP H170 | NanoSonic HybridSil | 1.7 | 8.31 | 1.891 | 9.25 | — | Center Behind Panel | 101 | 109 |
| 6 | Kevlar ® XP H170 | NanoSonic HybridSil | 1.5 | 7.33 | 1.880 | 9.19 | 90 | — | — | — |
| | Kevlar ® XP H170 | NanoSonic HybridSil | 1.5 | 7.33 | 1.933 | 9.45 | — | Center Behind Panel | 82 | 118 |
| 7 | Kevlar ® XP H170 | Versalink P-1000 (7 × 0.003") & Al (6 × 0.002") | 1.7 | 8.31 | 2.028 | 9.91 | 98 | — | — | — |
| | Kevlar ® XP H170 | Versalink P-1000 (7 × 0.003") & Al (6 × 0.002") | 1.7 | 8.31 | 2.004 | 9.80 | 97 | — | — | — |
| | Kevlar ® XP H170 | Versalink P-1000 (7 × 0.003") & Al (6 × 0.002") | 1.7 | 8.31 | 1.998 | 9.77 | — | Center Behind Panel | 85 | 94 |
| 8 | Kevlar ® XP H170 | Versalink P-1000 (4 × 0.007") & Al (3 × 0.008") | 1.5 | 7.33 | 1.974 | 9.65 | 94 | — | — | — |

TABLE 2-continued

| | Flat Panel Material Descriptions | | Flat Panel Areal Densities | | | | Ballistic Testing | Blast Testing Results | | |
|---|---|---|---|---|---|---|---|---|---|---|
| | Ballistic Resistant Composite Backing | Blast/Explosion Resistant Coating (ERC) | Composite Backing Before Coating | | ERC Coated Article After Coating | | Results 16 grain RCC V50 | Accelerometer Location | Acceleration % of | Velocity % of Example |
| | — | — | psf | kg/m² | psf | kg/m² | % Example C | — | Example C | C |
| | Kevlar ® XP H170 | Versalink P-1000 (4 × 0.007") & Al (3 × 0.008") | 1.5 | 7.33 | 2.011 | 9.83 | — | Center Behind Panel | 111 | 109 |
| 9 | Kevlar ® XP H170 | Versalink P-1000 (67%) & 1 mm SiC Spheres (33%) | 1.694 | 8.28 | 1.988 | 9.72 | 98 | — | — | — |
| 10 | Kevlar ® XP H170 | Versalink P-1000 (67%) & 1 mm SiC Spheres (33%) | 1.5 | 7.33 | 2.002 | 9.79 | 94 | — | — | — |
| | Kevlar ® XP H170 | Versalink P-1000 (67%) & 1 mm SiC Spheres (33%) | 1.5 | 7.33 | 2.012 | 9.84 | — | Center Behind Panel Repeat of Above | 70 67 | 100 93 |
| 11 | Kevlar ® XP H170 | Versalink P-1000 in Geometric Ribs | 1.5 | 7.33 | 2.177 | 10.64 | 91 | — | — | — |
| | Kevlar ® XP H170 | Versalink P-1000 in Geometric Ribs | 1.5 | 7.33 | 2.009 | 9.82 | — | Center Behind Panel Repeat of Above | 65 63 | 100 99 |

What is claimed is:

1. A composite article having improved blast resistance and ballistic resistance comprising
   (i) a first explosion resistant component facing a blast or ballistic source comprising a strain rate hardening elastomeric layer having a Young's modulus of from 7000 to 20000 psi at 100% strain and a strain-rate-sensitivity hardening in the strain rate range of approximately 1000/second to 1,000,000/second in association with a ballistic and/or explosive event, and
   (ii) a second ballistic-resistant component facing an article to be protected comprising at least one layer comprising continuous filament yarns impregnated or coated with resin or a non-filamentary oriented polyethylene layer and the second ballistic-resistant component is a helmet shell,
wherein
the continuous filament yarns have a tenacity of at least 15 grams per dtex and a modulus of at least 500 grams per dtex and the oriented polyethylene layer has a modulus in a first direction that is at least ten times greater than the modulus in a second direction.

2. The composite article of claim 1, comprising an optional third component positioned between the first and second components, the third component comprising at least one layer of continuous filament yarns or at least one layer of a non-filamentary oriented polyethylene layer.

3. The composite article of claim 1, comprising an optional fourth component positioned between the second component and the article to be protected, the fourth component comprising at least one layer of continuous filament yarns or at least one layer of a non-filamentary oriented polyethylene sheet.

4. The composite article of claim 1, wherein one or more of the layers of the second component comprises a woven fabric.

5. The composite article of claim 1, wherein one or more of the layers the second component comprises a non-woven fabric.

6. The composite article of claim 1, wherein the continuous filament yarns of the second component comprise polymeric filaments wherein the polymer is p-aramid, ultra-high molecular weight polyethylene, ultra-high molecular weight polypropylene, polyvinyl alcohol, polyazole or combinations thereof.

7. The composite article of claim 1, wherein the elastomeric layer of the first component further comprises particles having a diameter of from 0.002 to 0.04 inches.

8. The composite article of claim 1, wherein the elastomeric layer is configured into ridges.

9. The composite article of claim 1, wherein the elastomer comprises polyurethane, polyurea, or a mixture thereof.

10. The composite article of claim 6 wherein the nonwoven fabric is a felt, a randomly oriented fibrous matt or a unidirectional fabric.

11. A panel comprising the composite article of claim 1.

12. A helmet comprising the composite article of claim 1.

* * * * *